(12) United States Patent
Paddock

(10) Patent No.: US 7,284,331 B2
(45) Date of Patent: Oct. 23, 2007

(54) TRIMMER GUARD

(75) Inventor: Charles W. Paddock, Lancaster, NY (US)

(73) Assignee: Paddock-Phinney, LLC, Lancaster, NY (US)

( * ) Notice: Subject to any disclaimer, the term of this patent is extended or adjusted under 35 U.S.C. 154(b) by 0 days.

(21) Appl. No.: 11/254,896

(22) Filed: Oct. 20, 2005

(65) Prior Publication Data

US 2007/0089302 A1 Apr. 26, 2007

(51) Int. Cl.
*B26B 29/04* (2006.01)
(52) U.S. Cl. .............................. 30/276; 30/347; 30/286
(58) Field of Classification Search .................. 30/276, 30/347, 286; D15/16; 56/12.7
See application file for complete search history.

(56) References Cited

U.S. PATENT DOCUMENTS

| 3,848,838 | A | * | 11/1974 | Thomas | 248/541 |
|---|---|---|---|---|---|
| 5,396,915 | A | * | 3/1995 | Bomar | 135/16 |
| 5,524,349 | A | * | 6/1996 | Dolin | 30/276 |
| 6,226,876 | B1 | * | 5/2001 | Ezell | 30/276 |
| 6,751,871 | B2 | * | 6/2004 | Furnish | 30/276 |
| 6,757,980 | B2 | * | 7/2004 | Arsenault | 30/286 |
| 6,892,461 | B2 | * | 5/2005 | Peterson | 30/276 |
| 2005/0183269 | A1 | * | 8/2005 | Thompson | 30/286 |

OTHER PUBLICATIONS

"Mechanical Project Engineer". Aerotek Job Posting. Found on Career builder.com. Viewed Jan. 26, 2007.*
"Mechanical Engineering Designer". Column Engineering. Found on Careerbuilder.com. Printed and viewed Jan. 26, 2007.*
"Modern Plastics Handbook". Harper, Charles. McGraw Hill © 2000. pp. 1.21.*
Maier, C and Calafut, T. (1998). "Polypropylene- The Difinitive User's Guide and Databook". William Andrew Publishing/Plastics Design Library. Chapter 6 and pp. 90.*

* cited by examiner

*Primary Examiner*—Kenneth E. Peterson
*Assistant Examiner*—Sean Michalski
(74) *Attorney, Agent, or Firm*—Phillips Lytle LLP

(57) ABSTRACT

An improved trimmer guard (15), for use with a trimmer (16) having a motor (18), a head (19) and a shaft (20), comprising a mounting assembly (23) configured to mount to a trimmer shaft, a frame (24) supported by the mounting assembly and a foldable skirt (25) supported by the frame. The frame and the skirt may be configured and arranged to move from a first folded position (26) to a second expanded position (28). The skirt may comprise a material selected from a group consisting of polyethylene film, woven polypropylene, woven nylon, canvas and neoprene. The support frame may comprise a first arm (29) extending from a mounting assembly and a second arm (30) extending from the mounting assembly and the first and second arms may be pivotally connected to the mounting assembly. The first and second arms may pivot from a folded position that is substantially parallel to the shaft outwardly to an expanded position that is in a plane substantially perpendicular to the shaft.

7 Claims, 7 Drawing Sheets

TRIMMER GUARD

TECHNICAL FIELD

The present invention relates generally to the field of trimmers and, more particularly, to a flexible trimmer guard.

BACKGROUND ART

Trimmers are well-known in the prior art. Generally, such trimmers include a gas or electric motor at one end of a tubular shaft and a rotating head at the other end. The trimmer head rotates at high speeds to cut grass or brush. For lighter cutting a nylon line is used and for larger diameter cutting a metal blade or knife is used. It is also known in the prior art that a hard plastic guard may be mounted just above the trimmer head to provide protection from the blade. These guards are kept small in order to allow trimming of grass and weeds to occur uninhibited. However, trimmer guards known in the prior art are limited in size and often do not adequately protect against debris being thrown onto the user's feet or legs when in use. Due to the small size of the conventional guard, high amounts of grass, dirt, rocks and other lawn debris are typically propelled onto the lower legs, clothing, socks, shoes and feet of the user. Accordingly, it would be beneficial to have a trimmer guard which provides protection to the user from flying grass and debris typically thrown or propelled by string trimmers when in use.

DISCLOSURE OF THE INVENTION

With parenthetical reference to the corresponding parts, portions or surfaces of the disclosed embodiment, merely for the purposes of illustration and not by way of limitation, the present invention provides an improved trimmer guard (15), for use with a trimmer (16) having a motor (18), a head (19) and a shaft (20), comprising a mounting assembly (23) configured to mount to a trimmer shaft, a frame (24) supported by the mounting assembly, and a foldable skirt (25) supported by the frame. The frame and the skirt may be configured and arranged to move from a first folded position (26) to a second expanded position (28). The skirt may comprise a material selected from a group consisting of polyethylene film, woven polypropylene, woven nylon, canvas and neoprene. The support frame may comprise a first arm (29) extending from the mounting assembly and a second arm (30) extending from the mounting assembly, and the first and second arms may be pivotally connected to the mounting assembly. The first and second arms may pivot from a folded position that is substantially parallel to the shaft outwardly to an expanded position that is in a plane substantially perpendicular to the shaft. The skirt may comprise a first sleeve (31) for receiving the first arm and a second sleeve (32) for receiving the second arm. The support frame may comprise multiple arms extending from the mounting assembly and the mounting assembly may include a locking mechanism (33) for retaining the frame and skirt in the expanded position. The skirt may comprise an upper portion (34) and a lower portion (35), the upper and lower portions configured and arranged such that the lower portion pivots relative to the upper portion.

Accordingly, the general object of the present invention is to provide protection to the user from flying grass and debris typically thrown backwards by a trimmer.

Another object is to provide a trimmer guard which may be sold separately and mounted to the trimmer.

Another object is to provide a trimmer guard that may be easily mounted to or removed from the trimmer.

Another object is to provide a trimmer guard which may be folded against the shaft when not in use.

Another object is to provide a trimmer guard which provides increased protection against flying debris.

Another object is to provide a trimmer guard which may be used to augment the protection provided with the conventional hard plastic guard supplied with the trimmer.

Another object is to provide a trimmer guard that can be easily assembled and attached to the trimmer.

Another object is to provide a trimmer guard which may be adjusted by the user.

Another object is to provide a trimmer guard which is normally large in area but flexible enough to be moved of the way when cutting against foundations, fences and other obstacles.

These and other objects and advantages will become apparent from the foregoing and ongoing written specification, the drawings, and the appended claims.

DESCRIPTION OF THE PREFERRED EMBODIMENTS

Figure 1:
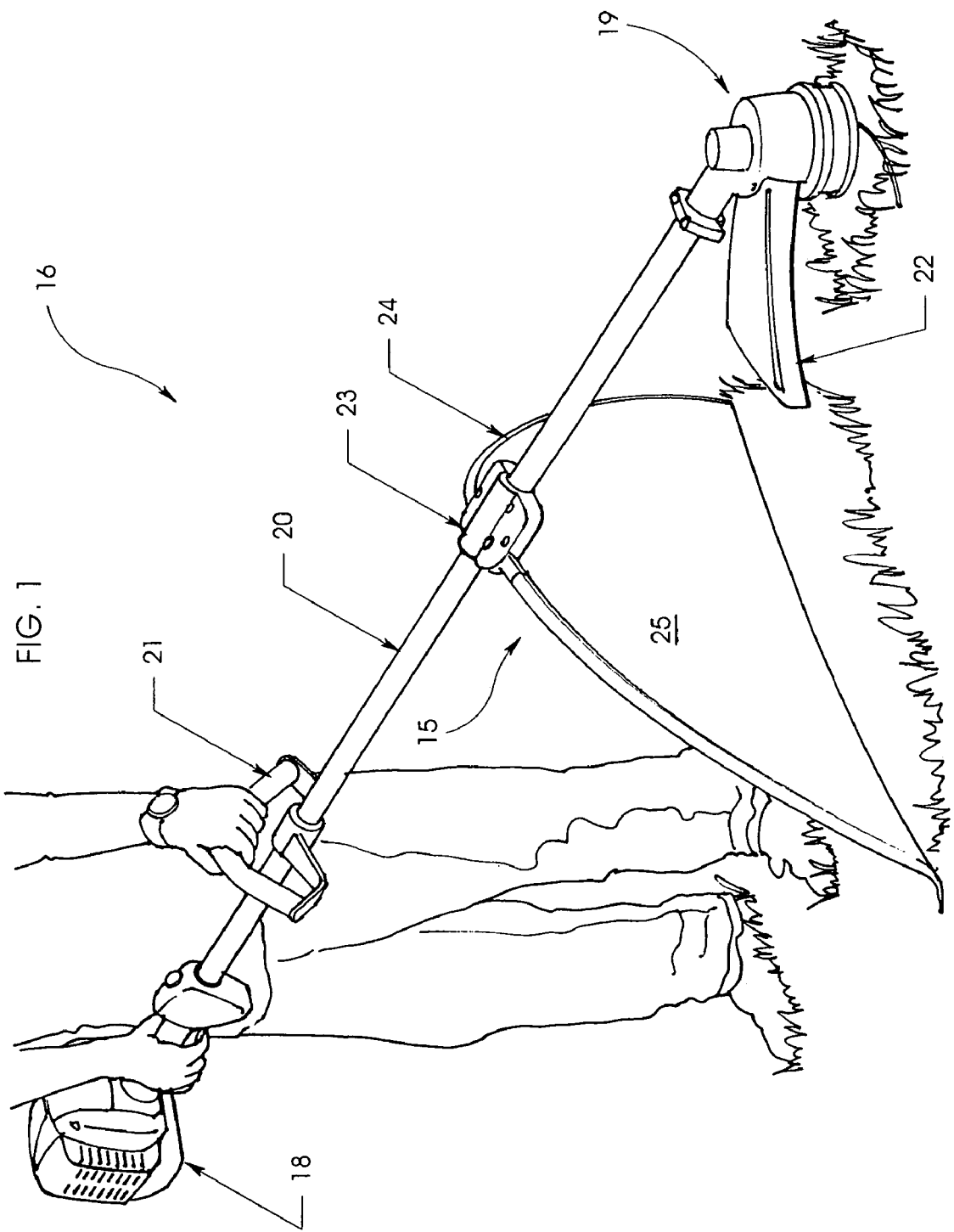
FIG. 1 is a perspective view of the trimmer guard in use on a conventional trimmer.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings and, more particularly, to FIG. 1 thereof, this invention provides an improved trimmer guard, the presently preferred embodiment of which is generally indicated at 15. As shown in FIG. 1, trimmer guard 15 is mounted to the shaft of a conventional trimmer 16, which generally has a gas or electric motor 18 at one end of a tubular shaft 20 and a rotating head 19 at the other end. Trimmer 16 includes a handle 21 and a conventional hard plastic guard 22. Conventional guard 22 generally includes a blade along one edge which cuts the nylon string extending from the head to the proper length. While trimmer 16 generally uses a nylon line that rotates at high speeds to cut grass, it is also known that a cutting blade may be used in place of such a string assembly.

As shown in FIG. 1, trimmer guard 15 generally comprises mounting assembly 23, frame 24 and skirt 25. Trimmer guard 15 is mounted between head 19 of trimmer 16 and the operator of trimmer 16.

FIG. 1 shows trimmer guard 15 in expanded position 28. In expanded position 28, skirt 25 extends from a point on the shaft 20 to the ground, protecting against debris being thrown back towards the user. Protective skirt 25 is unfolded and stretched by frame 24 to form a generally semi-circular barrier to debris thrown back by rotating head 19. As shown, arms 29 and 30 of frame 24 extend outwardly from mounting block assembly 23 in a plane that is substantially perpendicular to shaft 20.

Figure 2:
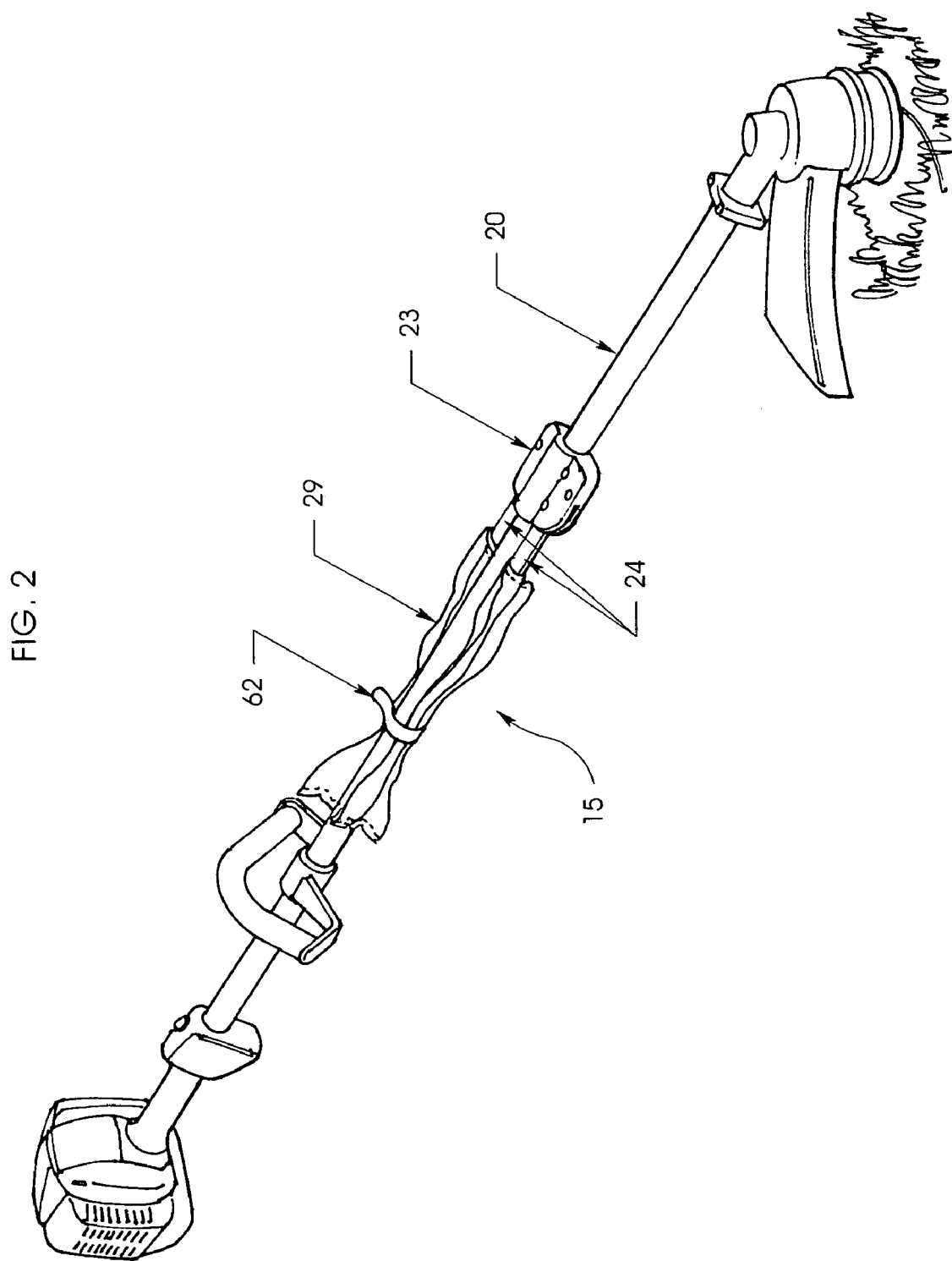
FIG. 2 is a perspective view of the trimmer guard shown in FIG. 1 in a folded position.

FIG. 2 shows trimmer guard 15 in folded position 29 against shaft 20. Frame 24 and mounting assembly 23 are configured such that frame 24 can be folded up against shaft 20 and secured with hook and loop fastener strap 62 when not in use.

Figure 3:
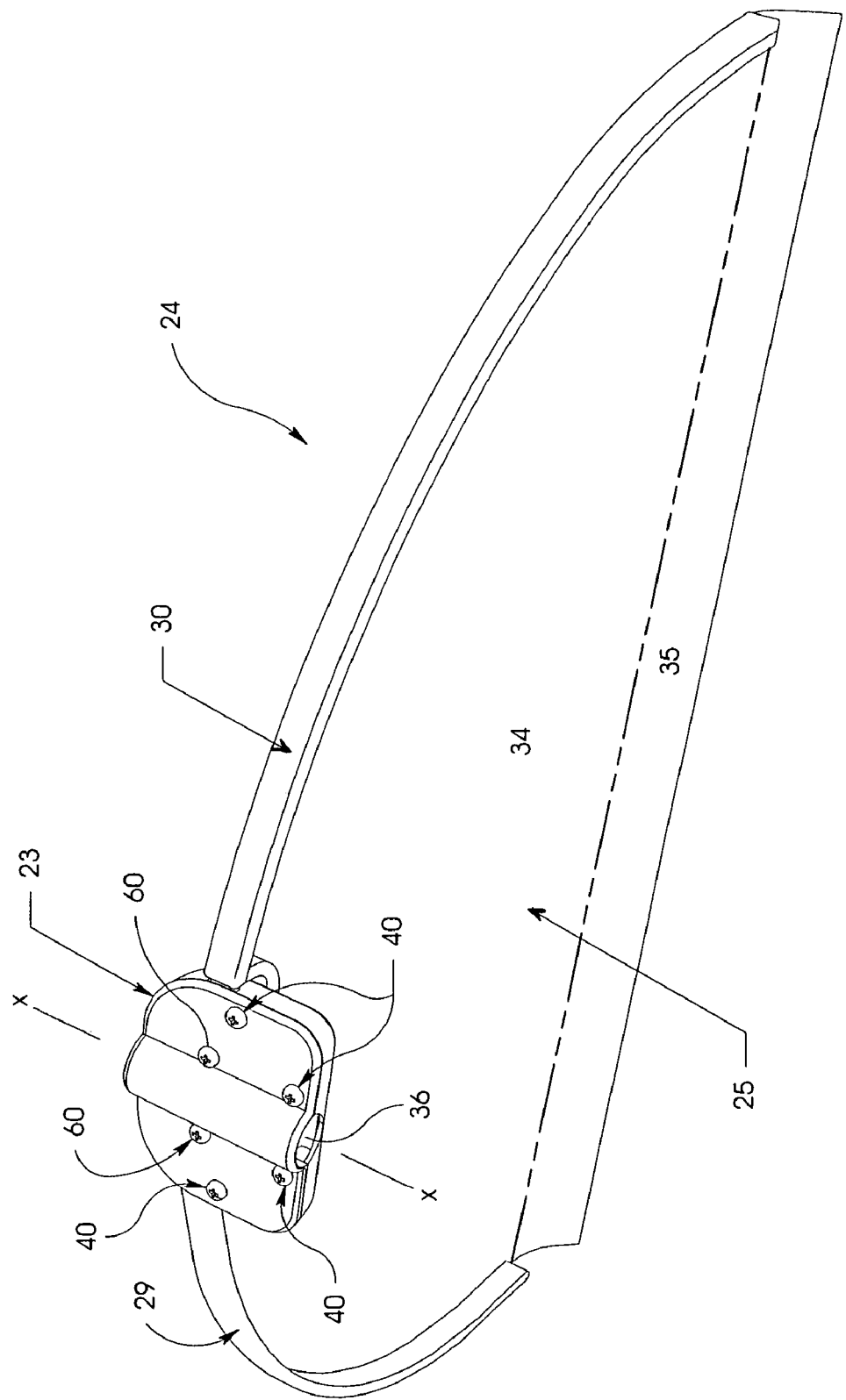
FIG. 3 is a perspective view of the trimmer guard shown in FIG. 1.
Figure 4:
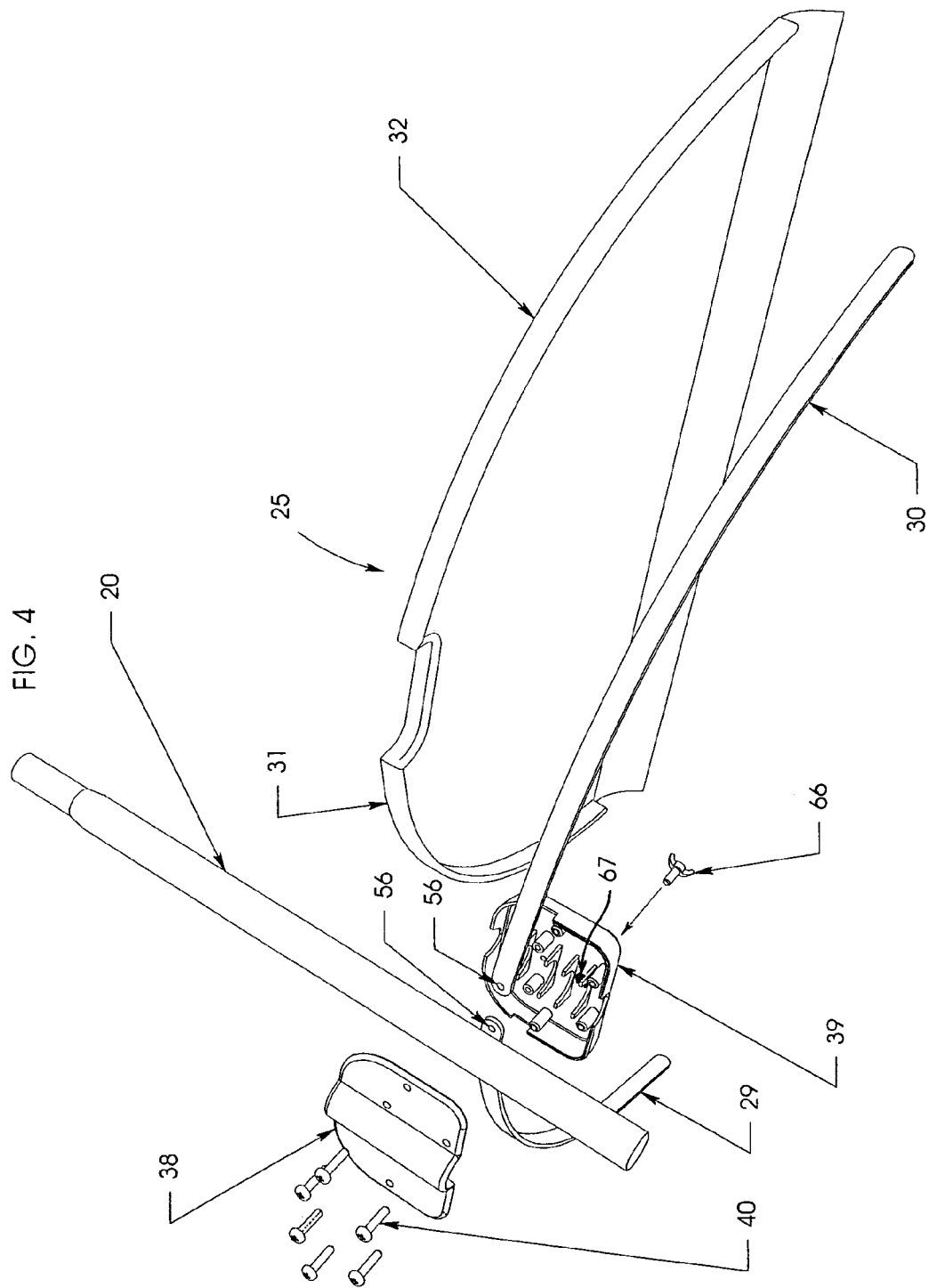
FIG. 4 is an exploded view of the trimmer guard shown in FIG. 1.
Figure 6:
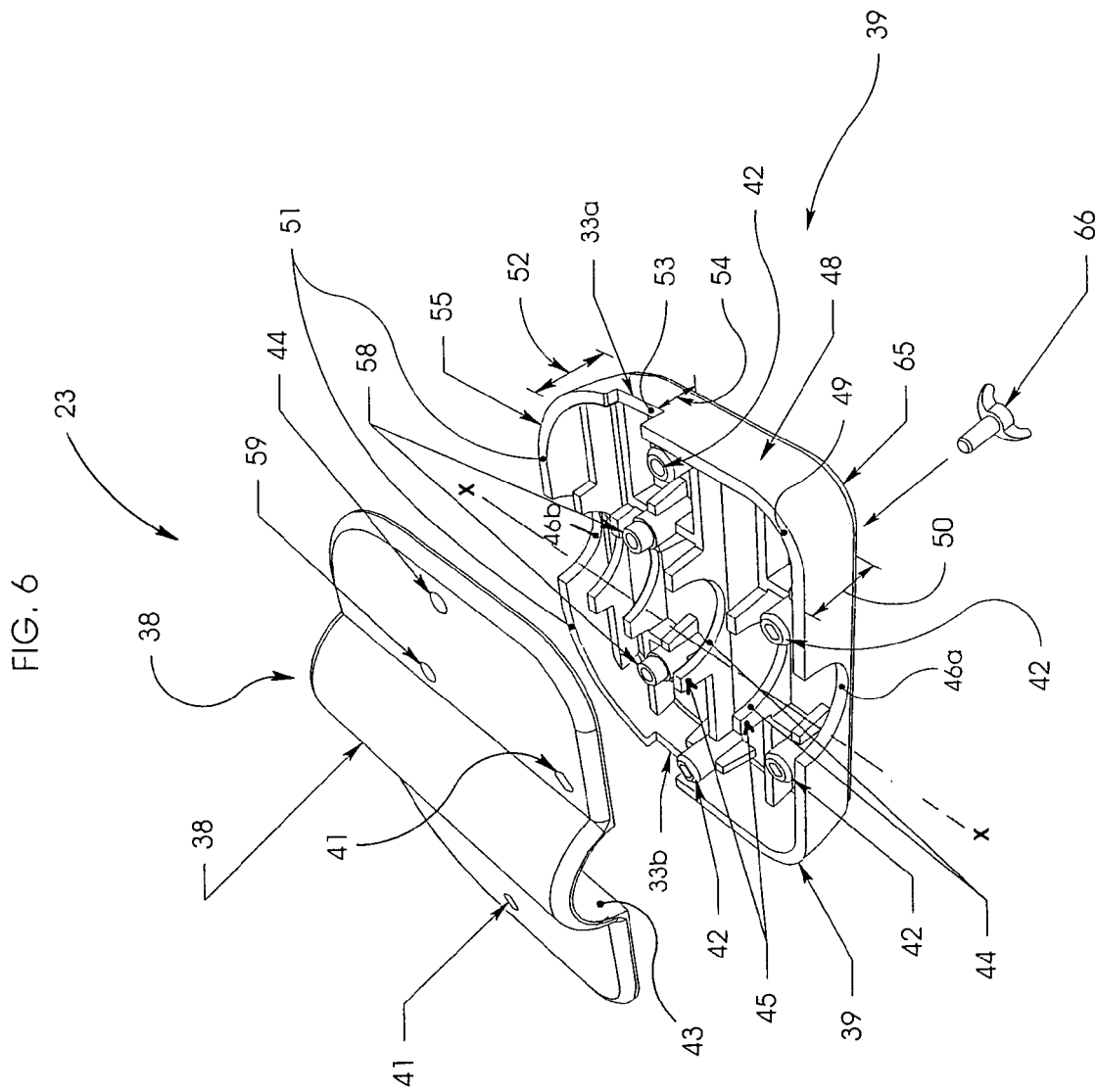
FIG. 6 is an enlarged exploded perspective view of the mounting assembly shown in FIG. 5.

As shown in FIGS. 3, 4 and 6, mounting assembly 23 generally comprises top portion 38 and bottom portion 39. Top portion 38 and bottom portion 39 clamp around shaft 20 and are held together with a series of screws 40 that extend through screw holes 41 in top portion 38 and into screw bosses 42 in bottom portion 39. As shown, mounting assembly 23 is molded so that, when aligned, top portion 38 and bottom portion 39 form cylindrical through-bore 36 about axis x-x. Through-bore 36 is generally cylindrical and has a diameter corresponding to the outer diameter of shaft 20. Through-bore 36 is formed by horizontally-extending inner semi-cylindrical surface 43 of top portion 38, and semi-cylindrical inner annular surfaces 44 of ribs 45 and inner semi-cylindrical annular surfaces 46a-b of bottom portion 39.

For smaller diameter trimmer shafts, a spacer may be inserted between the inner surface of through-bore 36 and the outer cylindrical surface of the shaft so that mounting assembly 23 may be used with smaller trimmer shafts. The spacer is a cylindrical member having a thickness equal to the difference between the inner diameter of through-bore 36 and the outer diameter of the shaft of the trimmer. In this way, the mounting assembly is adapted to be used with different trimmer shaft sizes.

Top portion 38 also includes two holes 59 on opposite sides of surface 43, and bottom portion 39 includes two similarly aligned bosses 58. These holes and bosses are configured to receive screws 60.

As shown in FIG. 6, bottom portion 38 includes sidewall 48 extending upwardly from the perimeter of bottom planar member 65. Along the front half of portion 39, sidewall 48 forms a top bearing surface 49. Surface 49 extends above member 65 a distance 50. Semi-cylindrical surface 46a extends from surface 49 into sidewall 48 with a radius corresponding to the radius of shaft 20. With respect to the portion of sidewall 48 defined by surface 49, sidewall 48 has a height 50 that is greater than the radius of shaft 20.

The rear half of sidewall 48 is lower than the front half of sidewall 48. In particular, top surface 51 of sidewall 48 is at a height 52 above bottom member 65. The difference between height 50 and height 52 is approximately equal to the thickness of arms 29 and 30 of frame 24. Annular surface 46b extends from surface 51 into sidewall 48. Channel 55, having a depth equal to the thickness of arms 29 and 30, is thereby defined by the bottom surface of top portion 38 and surface 51 of bottom portion 39.

Two detent notches 33a-b are cut into surface 51 at its junction with surface 49 on the right and left sides of portion 39 and perpendicular to axis x-x. Top surface 53 of notch 33 is at a height 54 lower than height 52 of surface 51. The difference between height 54 of surface 53 and height 52 of surface 51 is approximately equal to the thickness of arms 29 and 30. Surface 53 has a width that corresponds to the width of arms 29 and 30. Notches 33a-b form a locking mechanism to hold arms 29 and 30, respectively, in a position substantially perpendicular to axis x-x. The vertically extending surfaces between horizontal surface 53 and horizontal surface 51, and horizontal surface 53 and horizontal surface 49, hold arms 29 and 30, respectively, in place and keep them from pivoting.

As shown in FIGS. 3-6, frame 24 comprises arms 29 and 30. Arms 29 and 30 are flexible wands or battens. When un-biased, arms 29 and 30 are generally flat planar members having a given width and thickness. Arms 29 and 30 include through-bore 56 at one end.

As shown in FIGS. 4 and 6, through-bores 56 are of a diameter corresponding to bosses 58. Thus, bosses 58, through-bores 56 and holes 59 are aligned such that a pair of screws 60 can extend from one side of the assembly into the two respective bosses 58. Screws 60 are thereby used both to detachably tighten assembly 23 onto shaft 20 and to provide a pivot about which arms 29 and 30 rotate from folded position 26 substantially parallel to axis x-x to expanded position 28 substantially perpendicular to axis x-x.

In addition to screws 60, wing bolt 66 is inserted through bottom member 65 into a nut 67 set in a recess in the inner surface of bottom member 65 of portion 38 and tightened to secure mounting assembly 23 to trimmer shaft 20.

Figure 7:
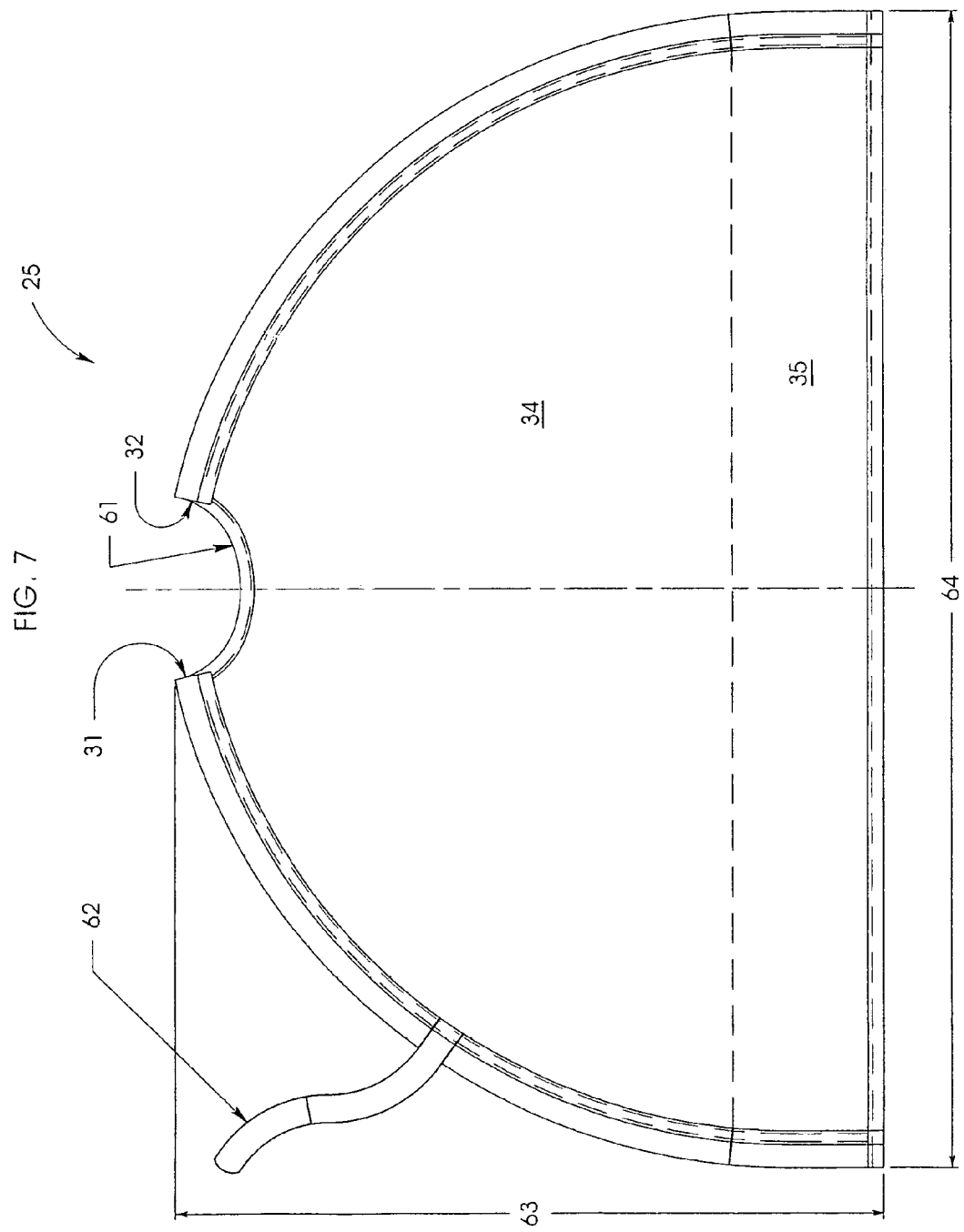
FIG. 7 is a perspective view of the skirt shown in FIG. 3.

As shown in FIG. 7, skirt 25 generally includes an upper portion 34, lower portion 35, first sleeve 31, second sleeve 32, relief 61, and strap 62. Upper portion 34 is held taut by frame 24 in an expanded position and provides protection against debris thrown by cutter head 19. Lower portion 35 is designed to brush along the surface of the ground when in use, thereby assuring that debris does find its way underneath the protective barrier of skirt 25.

As shown, skirt 25 is of a generally semi-circular shape with relief 61 cut into the peak to provide space for mounting assembly 23 when in an assembled position. Sleeves 31 and 32 extend from relief 61 along the curved edges of skirt 25. Sleeves 31 and 32 have an opened end at relief 61 and are closed at the other end. Sleeves 31 and 32 are dimensioned so as to receive arms 29 and 30, respectively. Arms 29 and 30 slide into sleeves 31 and 32 such that through-bores 56 are at the open end of the sleeve near relief 61. As arms 29 and 30 slide into sleeves 31 and 32 and are positioned on pivot boss sleeves 58 in assembly 23, they bend or flex in sleeves 31 and 32 to match the upper outside curvature of skirt 25 and to stretch open skirt 25 into expanded position 28. In the preferred embodiment, skirt 25 has a stretched height 63 of about eighteen inches and a length 64 of about thirty-two inches.

Strap 62 is a storage strap with hook and loop fastening material. When skirt 25 is folded, strap 62 wraps around skirt 25 to hold it against shaft 20 and in a folded position by securing the hook and loop fastening material.

In preferred embodiment, skirt 25 is formed of a flexible fabric material, and thereby may be unfolded into an extended position or folded into a storage position. In a preferred embodiment, skirt 25 is made of rip-stop nylon fabric. However, it is contemplated that skirt 25 may be made of other flexible fabric or material such as polyethylene film, woven polypropylene, woven nylon, canvas, and neoprene.

FIG. 7 shows skirt 25 in an expanded position, as if arms 29 and 30 were inserted into sleeves 31 and 32. When flexible arms 29 and 30 are inserted, the flexure of the arms opens and holds the skirt in the shape shown in FIG. 7.

Figure 5:
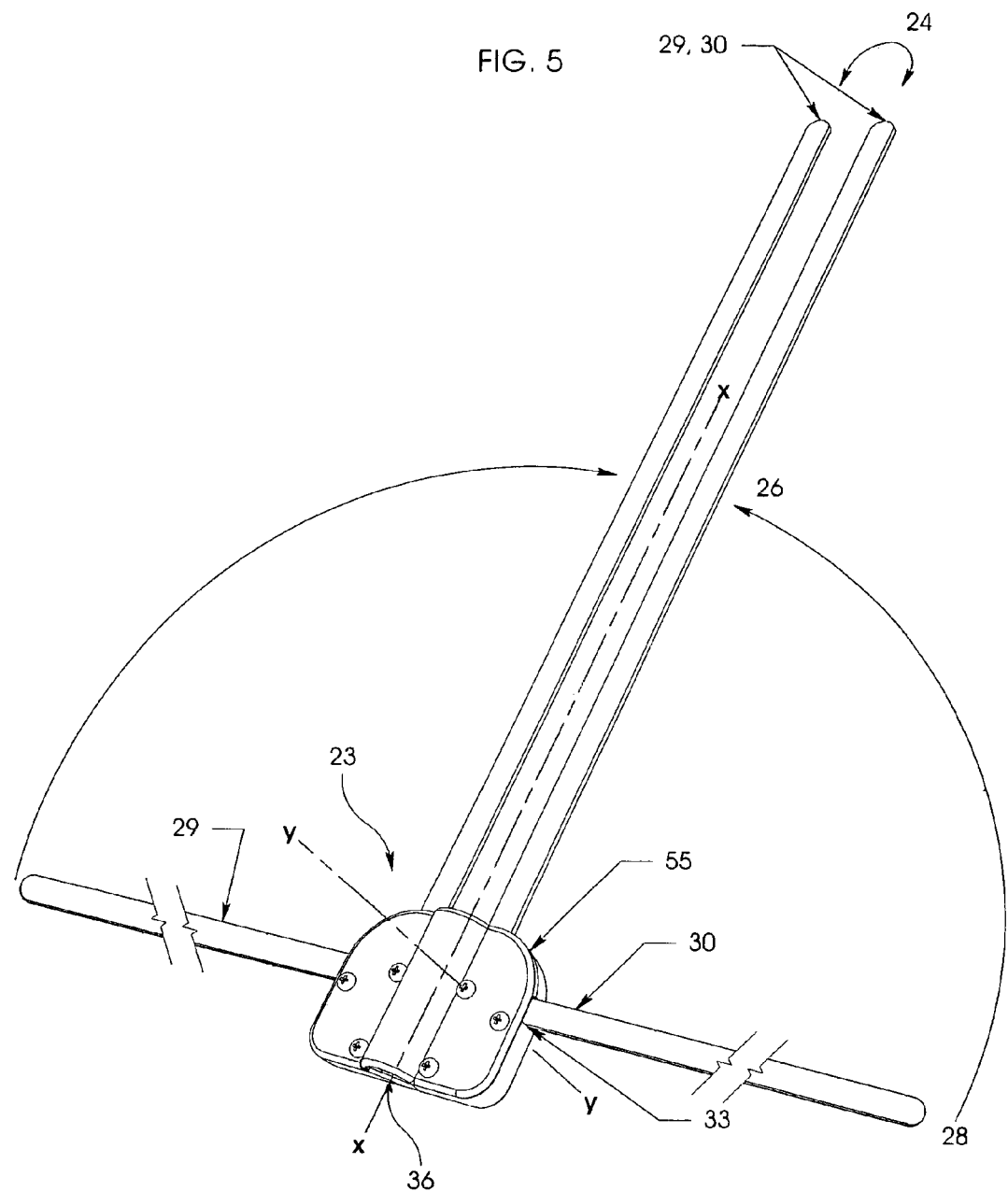
FIG. 5 is a perspective view of the support frame moving from an expanded position to a folded position.

As shown in FIG. 5, arms 29 and 30 move in channel 55 from folded position 26 to expanded position 28. When in expanded position 28, arms 29 and 30 drop into detents 33, respectively, and are thereby held in place. To release arms 29 and 30 from this locked position, pressure is applied upwards against the arms to force them out of detents 33 and into channels 55, whereupon they can be pivoted about pivot bosses 58.

FIG. 5 shows how mounting assembly 23 and frame 24 allow for the skirt to be moved between folded position 26 and expanded position 28. As shown, arm 30 pivots about axis y-y, which is the axis of through-bores 56 and 59 and pivot bosses 58. This pivot axis is perpendicular to the axis x-x of through-bore 36 of assembly 23. Thus, in expanded position 28, arms 29 and 30, together with skirt 25, are in a plane that is substantially perpendicular to axis x-x. Arms 29 and 30 may then be moved out of detents 33 and pivoted through channel 55 to a position that is substantially parallel to axis x-x. In this substantially parallel position, skirt 25 may be folded up against shaft 20 and held in a folded position by strap 62.

The present invention contemplates that other changes and modifications may be made. Therefore, while the presently preferred trimmer guard has been shown and described, and several modifications discussed, persons skilled in this art will readily appreciate that various additional changes and modifications may be made without departing from the spirit of the invention, as defined and differentiated by the following claims.

What is claimed is:

1. A trimmer guard, in combination with a trimmer having a motor, a head and a shaft, comprising:
    a mounting assembly mounted to a trimmer shaft about a shaft axis;
    a frame supported by said mounting assembly;
    said frame comprising a first flexible arm extending from said mounting assembly and pivotally connected to said mounting assembly to move from a first folded position which lies substantially parallel to said shaft axis to a second expanded and flexed position not parallel to said shaft axis, and a second flexible arm extending from said mounting assembly and pivotally connected to said mounting assembly to move from a first folded position which lies substantially parallel to said shaft axis to a second expanded and flexed position not parallel to said shaft axis;
    a flexible foldable skirt supported by said frame; and
    said frame and said skirt configured and arranged such that said first flexible arm and said second flexible arm support said skirt in an open expanded position when said arms are in said second expanded and flexed position.

2. The trimmer guard set forth in claim 1, wherein said skirt comprises a material selected from a group consisting of polyethylene film, woven polypropylene, nylon, canvas, and neoprene.

3. The trimmer guard set forth in claim 1, wherein said second expanded position is in a plane substantially perpendicular to said shaft.

4. The trimmer guard set forth in claim 1, wherein said skirt comprises a first sleeve for receiving said first arm and a second sleeve for receiving said second arm.

5. The trimmer guard set forth in claim 1, wherein said mounting assembly includes a locking mechanism for retaining said frame and skirt in said open expanded position.

6. The trimmer guard set forth in claim 1, wherein said skirt comprises:
    an upper portion;
    a lower portion;
    said upper and lower portions configured and arranged such that said lower portion pivots or flexes relative to said upper portion.

7. The trimmer guard set forth in claim 1, wherein said mounting assembly is configured to detachably mount to a trimmer shaft.

* * * * *